(12) United States Patent
Kimura

(10) Patent No.: US 10,960,710 B2
(45) Date of Patent: Mar. 30, 2021

(54) PNEUMATIC TIRE

(71) Applicant: Sumitomo Rubber Industries, Ltd., Kobe (JP)

(72) Inventor: Tatsuo Kimura, Kobe (JP)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 456 days.

(21) Appl. No.: 15/906,261

(22) Filed: Feb. 27, 2018

(65) Prior Publication Data
US 2018/0272809 A1 Sep. 27, 2018

(30) Foreign Application Priority Data

Mar. 21, 2017 (JP) ................. 2017-054137

(51) Int. Cl.
*B60C 11/11* (2006.01)
*B60C 11/03* (2006.01)
*B60C 11/12* (2006.01)

(52) U.S. Cl.
CPC ........... *B60C 11/0309* (2013.01); *B60C 11/11* (2013.01); *B60C 11/1204* (2013.01); *B60C 11/1236* (2013.01); *B60C 2011/0346* (2013.01); *B60C 2011/0376* (2013.01); *B60C 2011/0383* (2013.01); *B60C 2011/1209* (2013.01); *B60C 2011/1213* (2013.01); *B60C 2011/1227* (2013.01)

(58) Field of Classification Search
CPC ............. B60C 11/11; B60C 2011/0346; B60C 2011/0383
See application file for complete search history.

(56) References Cited

U.S. PATENT DOCUMENTS

| 4,676,290 A * | 6/1987 | Tansei ..................... B60C 11/11 |
| | | 152/209.22 |
| 5,031,680 A * | 7/1991 | Kajikawa ................ B60C 11/11 |
| | | 152/209.18 |

(Continued)

FOREIGN PATENT DOCUMENTS

| JP | 2006-298057 A | * 11/2006 |
| JP | 2012-011981 A | 1/2012 |

OTHER PUBLICATIONS

Machine translation for Japan 2006-298057 (Year: 2020).*

*Primary Examiner* — Steven D Maki
(74) *Attorney, Agent, or Firm* — Birch, Stewart, Kolasch & Birch, LLP

(57) ABSTRACT

A pneumatic tire includes a tread portion including a pair of first main grooves, a pair of second main grooves, a first land portion between the first main grooves and a pair of second land portions each sectioned adjacent one of the pair of first main grooves and one of the pair of second main grooves. The first main grooves extend in a trapezoidal wave manner including inner elements, outer elements and inclined connecting elements. One of the second land portions is provided with a second lateral groove opened at one of the outer elements. The first land portion is provided with a recess having an opening at the one of the outer elements. In a tire circumferential direction, a center of the opening of the recess is located at a position different from a position of an extension line of a centerline of the second lateral groove.

14 Claims, 6 Drawing Sheets

(56) References Cited

U.S. PATENT DOCUMENTS

| | | | |
|---|---|---|---|
| 2006/0016536 A1* | 1/2006 | Maxwell | B60C 11/11 152/209.18 |
| 2012/0000586 A1 | 1/2012 | Kami | |
| 2018/0326792 A1* | 11/2018 | Takano | B60C 11/0306 |
| 2019/0023079 A1* | 1/2019 | Nakano | B60C 11/11 |
| 2019/0054769 A1* | 2/2019 | Hoshino | B60C 11/11 |

* cited by examiner

PNEUMATIC TIRE

BACKGROUND ART

Field of the Invention

The present disclosure relates to pneumatic tires, and more particularly to a pneumatic tire capable of improving driving performance on snow while reducing pattern noise.

Description of the Related Art

Japanese Unexamined Patent Application Publication 2012-11981 discloses a pneumatic tire capable of improving driving performance on mud or snow while reducing noise performance. The tire, as illustrated in FIG. 6, includes a tread portion provided with center main grooves (a), shoulder main grooves (b), center lateral grooves (d) extending between the center main grooves (a), middle lateral grooves (e) extending between center main grooves (a) and the shoulder main grooves (b), and shoulder lateral grooves (f) extending outwardly in the tire axial direction from the shoulder main grooves (b). Each of the main grooves (a) and (b) is configured as a trapezoidal wave manner wherein the zigzag amplitude, groove widths, a number of the lateral grooves within a ground contact patch and groove widths of the lateral grooves are defined in the respective certain ranges.

According to a recent demand for high performance tires, further improvement on driving performance on snow condition is strongly requested.

SUMMARY OF THE INVENTION

The present disclosure has been made in view of the above problems in the conventional art, and has a main object to provide a pneumatic tire capable of improving driving performance on snow while reducing pattern noise.

In one aspect of the disclosure, a pneumatic tire includes a tread portion being provided with a pair of circumferentially extending first main grooves arranged such that a tire equator is located therebetween and a pair of circumferentially extending second main grooves each arranged outside the respective pair of first main grooves to form a first land portion sectioned between the pair of the first main grooves and a pair of second land portions each sectioned between adjacent one of the pair of first main grooves and one of the pair of second main grooves on each side of the tire equator. Each of the first main grooves extends in a trapezoidal wave manner including circumferentially extending inner elements located inwardly in a tire axial direction, circumferentially extending outer elements located outwardly in the tire axial direction of the inner elements and inclined connecting elements extending from the inner elements to the outer elements. One of the pair of second land portions is provided with a second lateral groove traversing completely the second land portion and opened at an outer edge in the tire axial direction of one of the outer elements of one of the pair of first main grooves. The first land portion is provided with a recess having an opening at an inner edge in the tire axial direction of the one of the outer elements of one of the pair of first main grooves. A center of the opening of the recess on the inner edge is located at a different position in a tire circumferential direction from an extension line of a centerline of the second lateral groove.

In another aspect of the disclosure, a circumferential distance Lf, on the inner edge of the one of the outer elements of the one of the pair of first main grooves, between the center of the opening of the recess and the extension line of the centerline of the second lateral groove may be in a range of from 100% to 130% of a groove width Y2 of the second lateral groove.

In another aspect of the disclosure, each the pair of first main grooves may have a zigzag amplitude Wj in a range of from 50% to 70% of a groove width W1 of each of the pair of first main grooves.

In another aspect of the disclosure, the opening of the recess, on the inner edge of the one of the outer elements of the one of the pair of first main grooves, may have a width Wd in a range of from 80% to 110% of a groove width Y2 of the second lateral groove.

In another aspect of the disclosure, the opening of the recess may have an axial length Le from the inner edge of the one of the outer elements of the one of the pair of first main grooves in a range of from 45% to 135% of a groove width W1 of the one of the pair of first main grooves.

In another aspect of the disclosure, the second lateral groove may have a groove width Y2 in a range of from 75% to 105% of a groove width W1 of the one of the pair of first main grooves.

In another aspect of the disclosure, the second lateral groove may be inclined at angle $\theta$ of from 20 to 40 degrees with respect to the tire axial direction.

In another aspect of the disclosure, a distance Lj from the tire equator to a zigzag center line of each of the first main grooves may be in a range of from 10% to 20% of an axial distance TW from the tire equator to one of tread edges.

In another aspect of the disclosure, the pair of first main grooves may have groove widths W1 in a range of from 2% to 6% of an axial distance TW from the tire equator to one of tread edges.

As used herein, the tread edge refers to the axially outermost edges of the ground contacting patch of the tread portion which occurs under a condition where the tire being under a standard condition is grounded on a plane with a standard tire load at the camber angle of zero. As used herein, the standard condition is such that the tire is mounted on a standard wheel rim with a standard pressure, but is loaded with no tire load.

As used herein, the standard wheel rim is a wheel rim officially approved for the tire by standards organizations, wherein the standard wheel rim is the "standard rim" specified in JATMA, the "Measuring Rim" in ETRTO, and the "Design Rim" in TRA or the like, for example.

As used herein, the standard pressure is a standard pressure officially approved for the tire by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example. In case, however, the tire is for a passenger car tire, the standard pressure is defined uniformly as 180 kPa.

As used herein, the standard tire load is a tire load officially approved for the tire by standards organizations, wherein the standard tire load is the "maximum load capacity" in JATMA, the "Load Capacity" in ETRTO, and the maximum value given in the above-mentioned table in TRA or the like, for example.

DESCRIPTION OF THE PREFERRED EMBODIMENTS

Some embodiments of the present disclosure will be explained below with reference to the accompanying drawings. Note that the following disclosure including embodiments as illustrated in figures is for the purpose of promoting an understanding of the principles of the invention, and is not intended to limit the scope of the invention.

Figure 1:
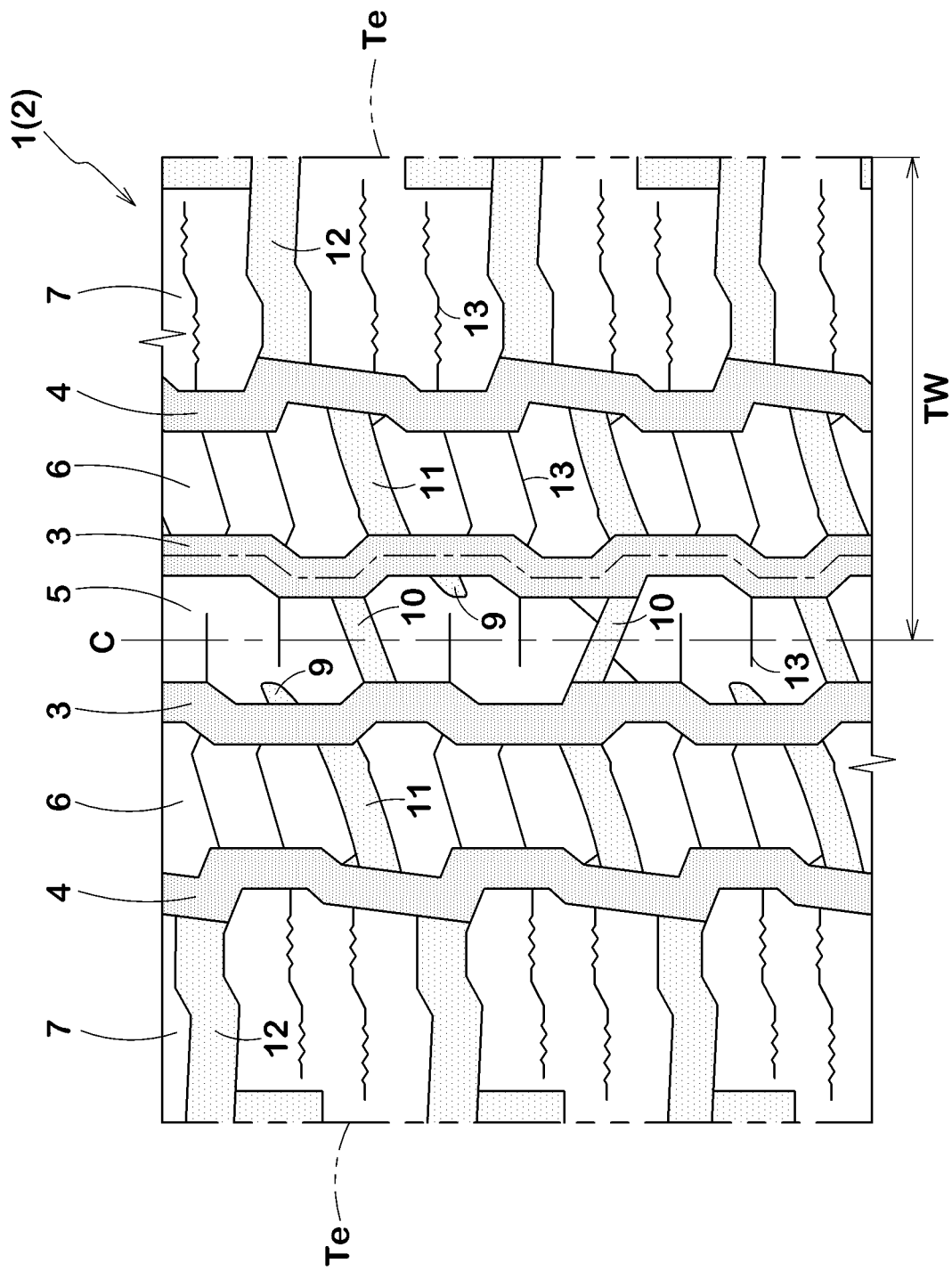
FIG. 1 is a development view of a tread portion of a pneumatic tire in accordance with one embodiment of the present disclosure.

As illustrated in FIG. 1, the pneumatic tire 1 in accordance with the present embodiment includes a tread portion 2 provided with a plurality of main grooves which includes a pair of circumferentially extending first main grooves 3 arranged such that the tire equator C is located therebetween and a pair of circumferentially extending second main grooves 4 each arranged outside the respective pair of first main grooves 3. The tread portion 2 thus is sectioned into a plurality of land portions which includes a first land portion 5 between the pair of the first main grooves 3 and a pair of second land portions 6 each between one of the pair of first main grooves 3 and one of the pair of second main grooves 4 on each side of the tire equator C.

In this embodiment, the main grooves consist of four main grooves which include the pair of first main grooves 3 as crown main grooves and the pair of second main grooves 4 as shoulder main grooves. Thus, the tread portion 2 is sectioned into five land portions which include the first land portion 5 as a crown land portion, the pair of second land portions 6 as middle land portions and a pair of third land portions 7 disposed outwardly in the tire axial direction of the second main grooves 4 as shoulder land portions.

Figure 2A:
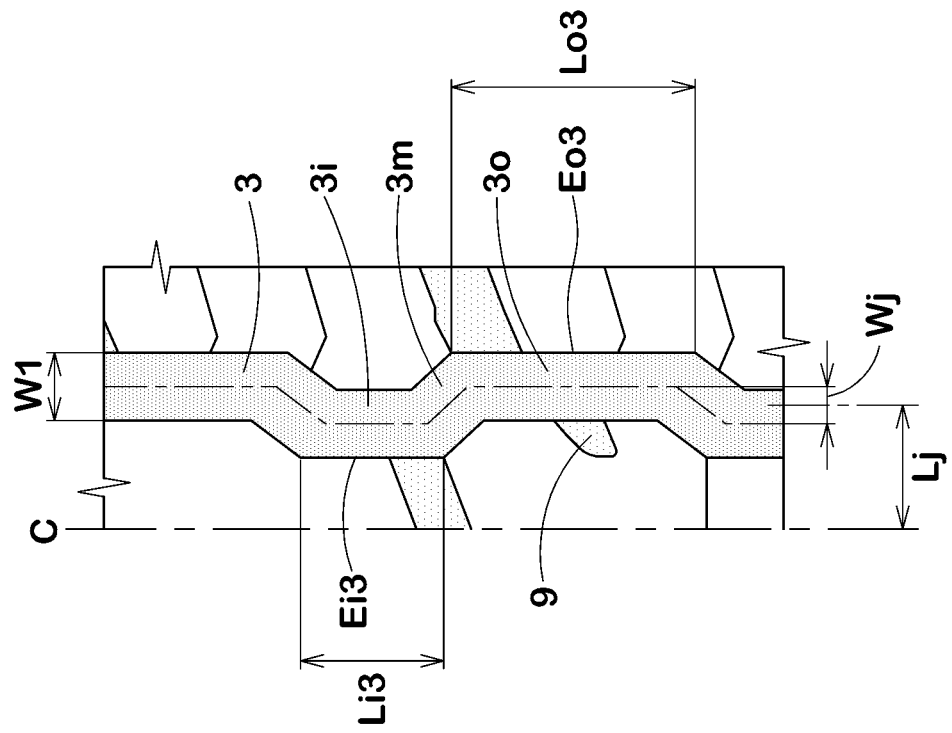
FIGS. 2A and 2B are partial enlarged views illustrating a first main groove and a second main groove, respectively.

As illustrated in FIG. 2A, each of the first main grooves 3 is configured as a zigzag groove extending in a trapezoidal wave manner which comprises inner elements 3$i$, outer elements 3$o$ and connecting elements 3$m$. The inner elements 3$i$ extend in the tire circumferential direction, e.g., in parallel with the tire circumferential direction, at locations inside the outer elements 3$o$ in the tire axial direction. The outer elements 3$o$ extend in the tire circumferential direction, e.g., in parallel with the tire circumferential direction, at locations outside the inner elements 3$i$ in the tire axial direction. Each of the connecting elements 3$m$ extends with an inclination with respect to the tire circumferential direction from one of the inner elements 3$i$ to one of the outer elements 3$o$ to connect with each other.

In this embodiment, each of the first main grooves 3 is configured as an asymmetrical zigzag shape which comprises circumferential lengths Li3 of the inner edges Ei3 in the tire axial direction of the inner elements 3$i$ are smaller than circumferential lengths Lo3 of the outer edges Eo3 in the tire axial direction of the outer elements 3$o$.

Preferably, each of the first main grooves 3 has a zigzag amplitude Wj in a range of from 50% to 70% of a groove width W1 of the first main groove 3. Note that the zigzag amplitude Wj is defined as a maximum distance in the tire axial direction between groove centerlines of adjacent one inner element 3$i$ and one outer element 3$o$. Preferably, each of the first main grooves 3 has the groove width W1 in a range of from 2% to 6% of a tread half width which is an axial distance TW (illustrated in FIG. 1) from the tire equator C to one of the tread edges Te. Further, a distance Lj from the tire equator C to an amplitude center line of each of the first main grooves 3 may preferably be in a range of from 10% to 20% of the tread half widths TW.

Figure 3:
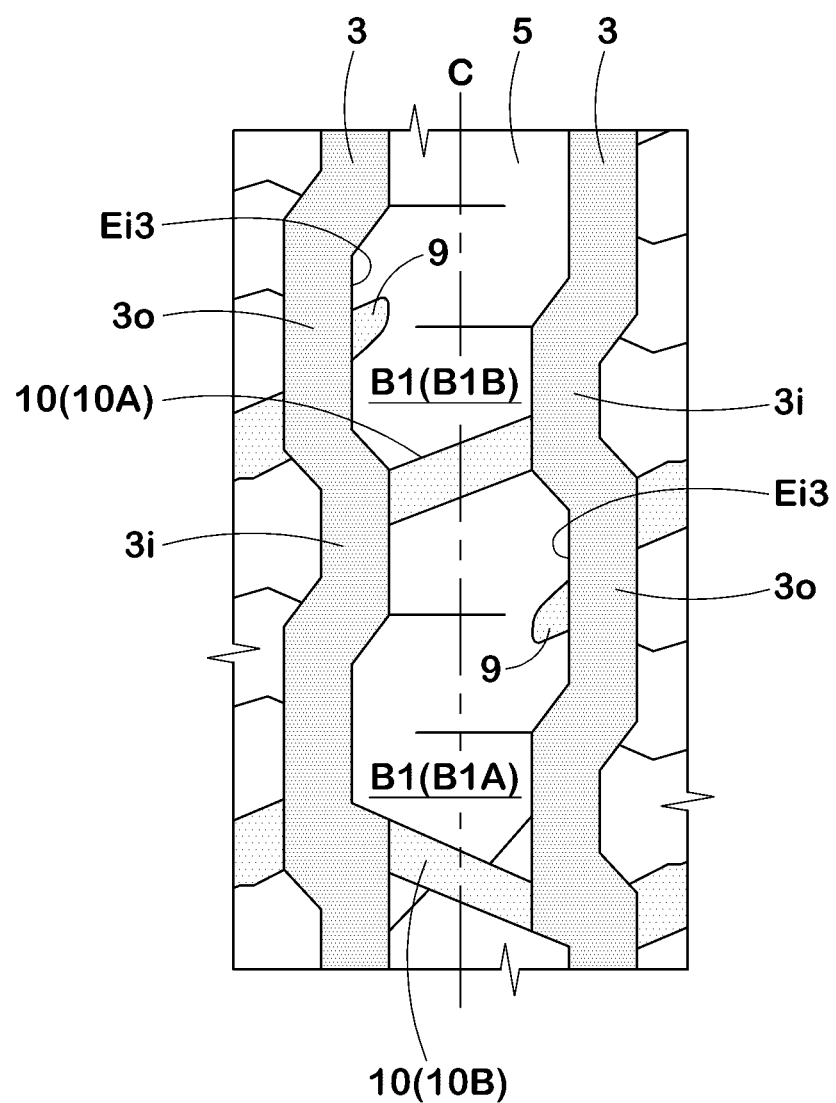
FIG. 3 is a partial enlarged view of a first land portion.

As illustrated in FIG. 3, in some preferred embodiments, the first main grooves 3 are arranged to have a phase difference in the tire circumferential direction from each other such that each of the outer elements 3$o$ of one of the first main grooves 3 (i.e. the right side in FIG. 3) may face each of the inner elements 3$i$ of the other one of the first main grooves 3 (i.e. the left side in FIG. 3). Thus, the first land portion 5 may have a substantially constant width.

The first land portion 5 is provided with at least one recess 9 which opens at one inner edges Ei3 in the tire axial direction of one outer element 3$o$. The recess 9 extends inwardly in the tire axial direction, and preferably terminates within the first land portion 5 without going beyond the tire equator C.

In this embodiment, the first land portion 5 is further provided with a plurality of first lateral grooves 10 which traverses completely the first land portion 5 to section the first land portion 5 into a plurality of first blocks B1. In this embodiment, the first lateral grooves 10 include some first lateral grooves 10A inclined in a first direction with respect to the tire axial direction and some first lateral grooves 10B inclined in a second direction opposite to the first direction with respect to the tire axial direction. Preferably, the first lateral grooves 10A and 10B are arranged alternately in the tire circumferential direction. In this embodiment, the first lateral grooves 10A and 10B connect between the inner elements 3$i$ of one of the first main grooves 3 and the inner elements 3$i$ of the other one of the first main grooves 3.

In some preferred embodiments, each of the first blocks B1 may be provided with the recess 9. In some preferred embodiments, first blocks B1 include at least one first blocks B1A having the recess 9 opening at one of the first main grooves 3, and at least one first blocks B1B having the recess 9 opening at the other one of the first main grooves 3. In some preferred embodiments, the first blocks B1A and the first blocks B1B may be arranged alternately in the tire circumferential direction.

Figure 2B:
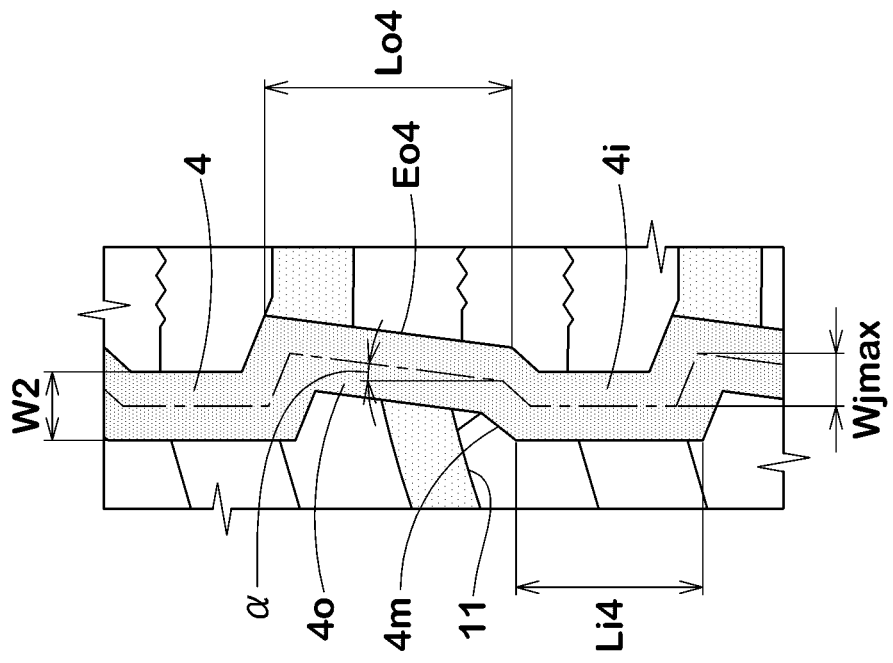

As illustrated in FIG. 2B, each of the second main grooves 4 is configured as a zigzag groove extending in a trapezoidal wave manner which comprises inner elements 4$i$, outer elements 4$o$ and connecting elements 4$m$. The inner elements 4$i$ extend in the tire circumferential direction, e.g., in parallel with the tire circumferential direction, at locations inside the outer elements 4$o$ in the tire axial direction. The outer elements 4$o$ extend in the tire circumferential direction at locations outside the inner elements 4$i$ in the tire axial direction. In this embodiment, the outer elements 4$o$ are inclined with respect to the tire circumferential direction at a small angle α, e.g., equal to or less than 10 degrees. Each of the connecting elements 4$m$ extends with an inclination with respect to the tire circumferential direction from one of the inner elements 4$i$ to one of the outer elements 4$o$ to connect with each other.

In this embodiment, in the second main grooves 4, the circumferential lengths Li4 of the inner edges Ei3 in the tire axial direction of the inner elements 4$i$ are smaller than the circumferential lengths Lo4 of the outer edges Eo4 in the tire axial direction of the outer elements 4$o$.

Preferably, the maximum zigzag amplitude (Wjmax) of the respective second main grooves 4 may be in a range of from 50% to 70% of the respective groove widths W2 of the second main grooves 4. Furthermore, the groove widths W2 of the second main grooves 4 may preferably be in a range of from 2% to 6% of the tread half width TW. In this embodiment, the groove widths W2 are set in a range of from 90% to 110% of the groove widths W1 of the first main grooves 3.

Figure 4:
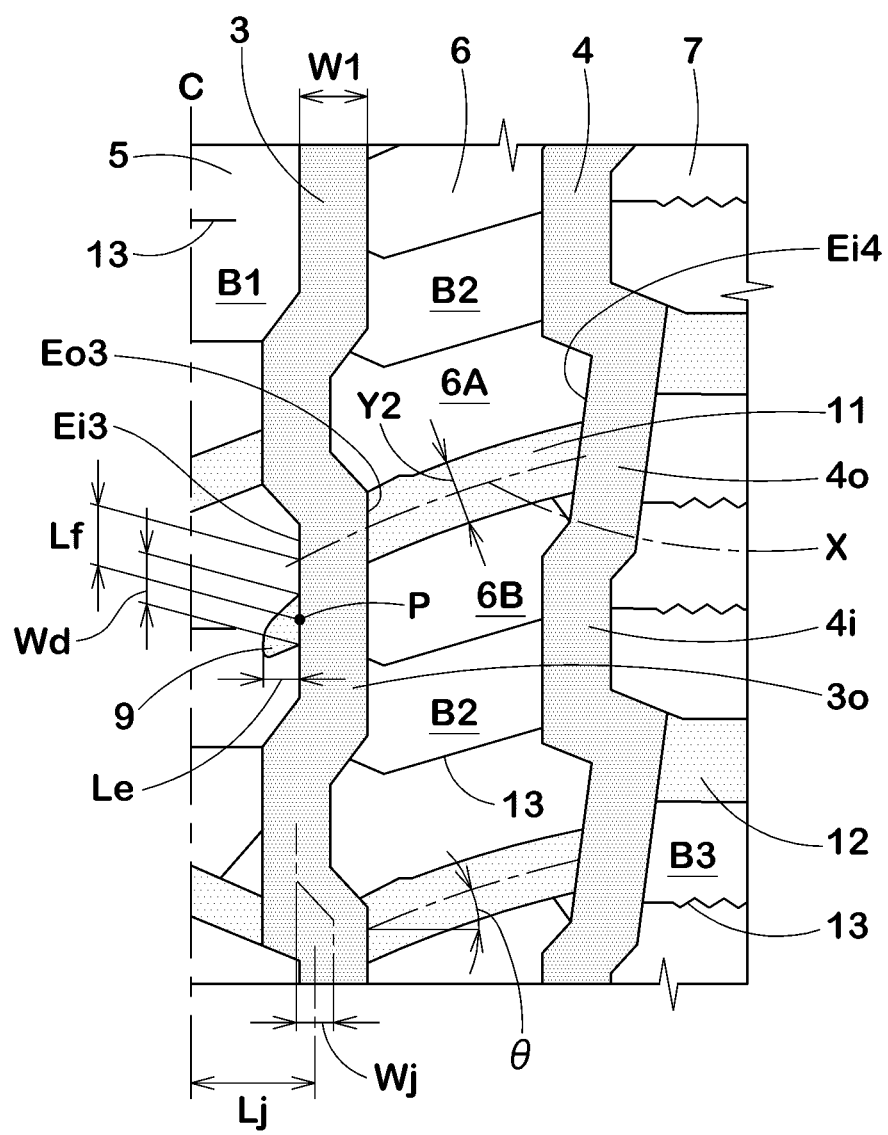
FIG. 4 is a partial enlarged view of a second land portion.

As illustrated in FIG. 4, in a pair of adjacent one first main groove 3 and one second main groove 4, each of the outer elements 3o of the first main groove 3 faces each of the inner elements 4i of the second main groove 4 in the tire axial direction. The second land portion 6 thus may be formed in such a manner that wide portions 6A and narrow portions 6B appear alternately in the tire circumferential direction.

In this embodiment, the second land portions 6 each are provided with a plurality of second lateral grooves 11 which traverses completely the second land portions to section the second land portions 6 into a plurality of second blocks B2. Each of the second lateral grooves 11 has an inner end in the tire axial direction, and the inner end opens at one outer edge Eo3 of one outer element 3o of the first main groove 3. In this embodiment, the first main grooves 3 includes at least one, preferably a plurality of outer elements 3o with which both one recess 9 and one second lateral groove 11 are communicated. Further, each of the second lateral grooves 11 has an outer end in the tire axial direction, and the outer end opens at the inner edge Ei4 of each of the outer elements 4o of the second main groove 4.

In at least one outer element 3o with which both one recess 9 and one second lateral groove 11 are communicated, the center P of the opening of the recess 9 at the inner edge Ei3 is located at a different position in the tire circumferential direction from the extension line of the groove centerline X of the second lateral groove 11.

As described above, since the first main grooves 3 which may be supposed to have a significant influence to driving performance on snow by receiving a large ground contact pressure are configured as zigzag grooves in a trapezoidal manner, these zigzag grooves may generate powerful snow-shearing force by compressing snow strongly, thereby improving driving performance on snow. In particular, since the second main grooves 4 in accordance with the present embodiment are also configured as zigzag grooves in a trapezoidal manner, driving performance on snow may further be improved.

When the zigzag amplitude Wj of each of the first main grooves 3 is set equal to or more than 50% of the groove width W1 of the first main groove 3, driving performance on snow may further be improved by increasing in strength of snow column compressed by the main grooves 3. When the zigzag amplitude Wj is set equal to ore less than 70% of the groove width W1 of the first main groove 3, uneven wear resistance of the first blocks B1 may further be improved since the difference between the first blocks B1 in rigidity become small. When the distance Lj from the tire equator C to the zigzag center line of each of the first main grooves 3 is set equal to or less than 20% of the tread half width TW, driving performance on snow may further be improved since a sufficiently larger ground contact pressure may act on the first main grooves 3. When the distance Lj is set equal to or more than 10% of the tread half width TW, uneven wear resistance of the first land portion 5 may further be improved since the first land portion 5 may have sufficient rigidity.

Further, the pneumatic tire 1 can exert better driving traction on snow by providing the recesses 9 on the first land portion 5 which tends to receive a large ground contact pressure. Furthermore, the above combination of one recess 9 and one second lateral groove 11 may form a supplementary snow blocks to strength a snow column compressed by the first main groove 3, thereby generating powerful snow-shearing force.

Since each recess 9 opens at one of the outer elements 3o, each recess 9 can be arranged at a location away from the tire equator C at a distance corresponding to the amplitude Wj, as compared with each recess 9 which opens at one of the inner elements 3i. Such a configuration may suppress uneven wear of the first land portion 5 due to each recess 9 while maintaining the first land portion 5 in rigidity. Alternatively, such a configuration may further improve driving traction on snow by increasing a length Le of each recess 9 while maintaining the first land portion 5 in rigidity.

As described above, since the center P of the opening of the recess 9 is located at a different position in the tire circumferential direction from a position of the extension line of the groove centerline X of the second lateral groove 11 as illustrated in FIG. 4, the air in the second lateral groove 11 may hardly flow into the recess 9. As a result, air-pumping noise can be lowered so that deterioration of tread pattern noise due to the recess 9 can be suppressed.

In order to further suppress the deterioration of tread pattern noise, a circumferential distance Lf, at the inner edge Ei3 of the outer element 3o, between the center P of the opening of the recess 9 and the extension line of the centerline X of the second lateral groove 11 is in a range of from 100% to 130% of the groove width Y2 of the second lateral groove 11. When the circumferential distance Lf is less than 100% of the groove width Y2, it may be difficult to exert an effect on reducing the air-pumping noise. On the other hand, when the circumferential distance Lf is more than 130% of the groove width Y2, it may be difficult to improve snow-shearing force of the tire since the recess 9 and the second lateral groove 11 which are arranged far away from each other may not reinforce sufficiently a snow column formed by the first main grooves 3.

Preferably, the groove widths Y2 of the second lateral grooves 11 may be in a range of from 75% to 105% of the groove widths W1 of the first main grooves 3.

It may be preferable that the recesses 9 are designed in a larger shape so as to form a snow column firmly in order to improve driving performance on snow. On the other hand, when the recesses 9 become too large, air-pumping noise may become louder due to an increase of its void volume. In view of the above, on the inner edge Ei3, an opening width Wd of the recess 9 may preferably be in a range of from 80% to 110% of the groove width Y2 of the second lateral groove 11. Further, an axial length Le of the recesses 9 from the inner edge Ei3 of the outer element 3o may preferably in a range of from 45% to 135% of the groove width W1 of the first main groove 3 in order to further improve driving performance as well as noise performance.

In order to reduce tread pattern noise sufficiently, each of the second lateral grooves 11 may preferably be inclined at an angle θ with respect to the tire axial direction, e.g., in a range of from 20 to 40 degrees. When the angle θ is less than 20 degrees, air-pumping noise may become louder, leading to disadvantage to pattern noise. On the other hand, the angle θ exceeds 40 degrees, the second blocks B2 may be shaped to have acute angled portions, leading to disadvantage to uneven wear resistance since the difference in rigidity between of the blocks become larger. The second lateral groove 11 may extend in a straight manner, or in the alternative, in an arc-shaped manner. When each of the second lateral grooves 11 extends in an arc-shaped manner, the above angle θ which is measured using its tangent lines preferably satisfies the above range.

Each of the third land portions 7 is provided with a plurality of third lateral grooves 12 which traverse completely the third land portion 7 to section the third land portion into a plurality of third blocks B3. In some preferred embodiments, the first, second and third blocks B1 to B3 may be provided with sipes 13 in order to exert edge effect.

Figure 5:
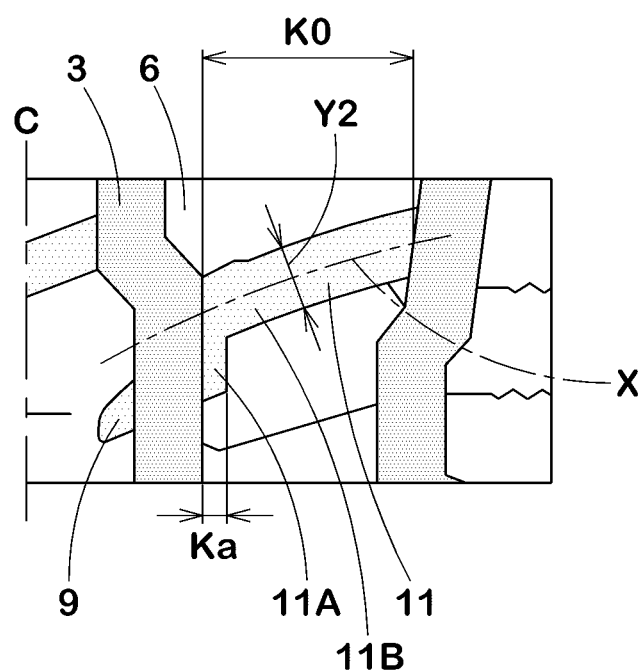
FIG. 5 is a partial enlarged view of a second lateral groove in accordance with another embodiment.
Figure 6:
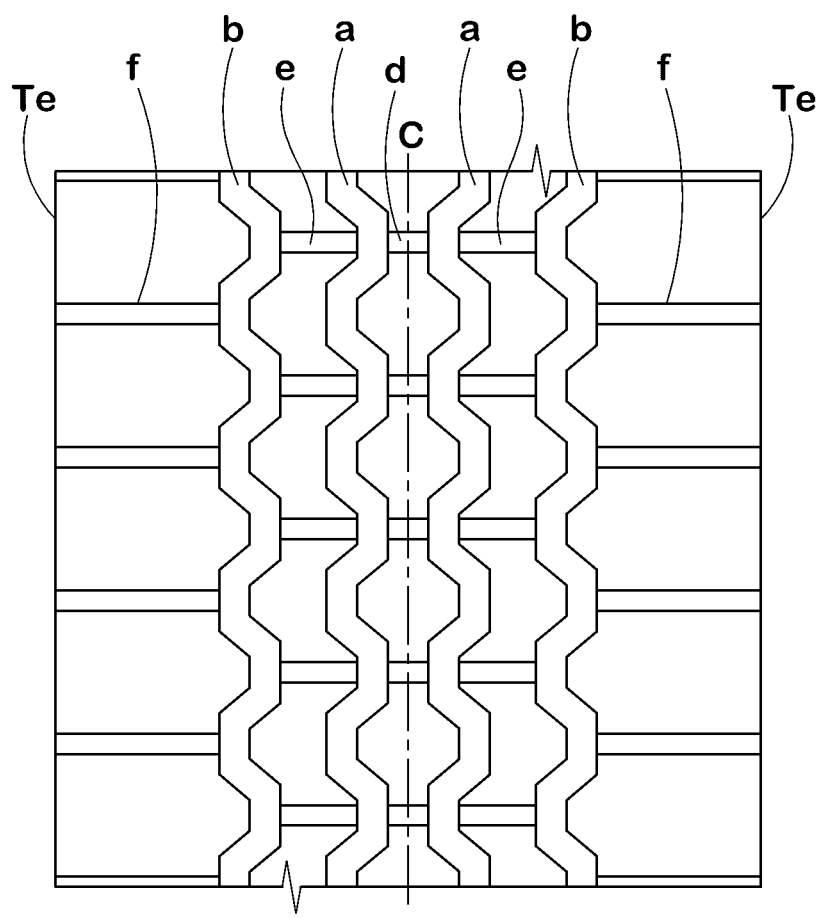
FIG. 6 is a development view of one example of a tread pattern of a conventional tire.

FIG. 5 illustrates one second lateral groove 11 in accordance with another embodiment. In this embodiment, the second lateral groove 11 has a groove width Y2 which varies in the tire axial direction. In this embodiment, the second lateral groove 11 includes a main portion 11B having a constant groove width and a chamfered portion 11A having a groove width greater than that of the main portion 11B. The chamfered portion 11A is formed on a corner of the second land portion 6 on the side of the first main groove 3 so as to be in communication with the main portion 11B. In case that a length Ka of the chamfered portion 11A in the tire axial direction is equal to or less than 20% of the entire length K0 in the tire axial direction of the second lateral groove 11, the centerline X of the second lateral groove 11 and its extension line are defined using a remaining portion, e.g. the main portion, of the second lateral groove 11 except the chamfered portion 11A.

Test for Driving Performance on Snow:

A necessary distance for accelerating the above test car from 5 mph to 20 mph on a compressed snow road was measured on each test tire. The test results were shown in Table 1 using an index wherein the measurement of Ref. 1 is set to 100. The larger the value, the greater the snow traction is.

Test for Tread Pattern Noise:

A test driver drove the test vehicle on a circuit track having a dry asphalt road to evaluate the pattern noise by his sense. The test results are shown in Table 1 using an index, wherein the larger the value the smaller the pattern noise.

Test for Uneven Wear Resistance:

Using an Abrasion tester, wear energy of each test tire was measured under the condition which is the same as a condition where the tire was mounted on a front wheel of the test vehicle, and then uneven wear property of each test tire was measured base on the wear energy. The test results are shown in Table 1 using an index, wherein the larger the value the better the uneven wear resistance is.

TABLE 1

|  | Ref. 1 | Ex. 1 | Ex. 2 | Ex. 3 | Ex. 4 | Ex. 5 | Ex. 6 | Ex. 7 |
|---|---|---|---|---|---|---|---|---|
| <Recesses> | None | | | | Presence | | | |
| Ratio Lf/Y2 of circumferential distance Lf to groove width Y2 of second lateral groove (%) | — | 115 | 100 | 130 | | | 115 | |
| Ratio Wd/Y2 of recess width Wd to groove width Y2 of second lateral groove (%) | — | | 95 | | 80 | 110 | | 95 |
| Ratio Le/W1 of recess length Ls to groove widths (W1) of first main grooves (%) | — | | | 90 | | | 45 | 135 |
| <First main grooves> | | | | | | | | |
| Zigzag amplitude ratio Wj/W1 (%) | | | | | 60 | | | |
| Distance ratio Lj/TW (%) | | | | | 15 | | | |
| Groove width ratio W1/TW (%) | | | | | 4 | | | |
| <Second lateral grooves> | | | | | | | | |
| Angle θ (deg.) | | | | | 30 | | | |
| Groove widths ratio Y2/W1 (%) | | | | | 90 | | | |
| Driving performance on snow | 100 | 120 | 122 | 110 | 110 | 122 | 110 | 122 |
| Pattern noise | 100 | 100 | 98 | 100 | 100 | 100 | 100 | 100 |
| Uneven wear resistance | 100 | 100 | 100 | 100 | 100 | 95 | 100 | 95 |

While the particularly preferable embodiments in accordance with the present invention have been described in detail, the present invention is not limited to the illustrated embodiments, but can be modified and carried out in various aspects.

Working Example

Some winter tires, 265/70R17, having a basic tread pattern as illustrated in FIG. 1 were manufactured based on the details shown in Table 1 to test driving performance on snow, tread pattern noise and uneven wear resistance. A comparative reference tire (Ref. 1) without having the recess was also manufactured.

The common specification of the tires and test procedures are as follows.

Rim size: 17×7.5 JJ

Tire inner pressure: 240 kPa

Test vehicle: four-wheel-drive car with 1500 cc displacement

Tire location: all wheels

From the test results, it was confirmed that the example tires had been improved in driving performance on snow while suppressing pattern noise.

What is claimed is:

1. A pneumatic tire comprising:
   a tread portion being provided with a pair of circumferentially extending first main grooves arranged such that a tire equator is located therebetween and a pair of circumferentially extending second main grooves each arranged outside the respective pair of first main grooves to form a first land portion sectioned between the pair of the first main grooves and a pair of second land portions each sectioned between adjacent one of the pair of first main grooves and one of the pair of second main grooves on each side of the tire equator;
   each of the first main grooves extending in a trapezoidal wave manner comprising circumferentially extending inner elements located inwardly in a tire axial direction, circumferentially extending outer elements located outwardly in the tire axial direction of the inner elements and inclined connecting elements extending from the inner elements to the outer elements;

one of the pair of second land portions being provided with a second lateral groove traversing completely the second land portion and opened at an outer edge in the tire axial direction of one of the outer elements of one of the pair of first main grooves;

the first land portion being provided with a plurality of first lateral grooves to section the first land portion into a plurality of first blocks, each of the plurality of first blocks being provided with a single recess, the recess having an opening at an inner edge in the tire axial direction of the one of the outer elements of the one of the pair of first main grooves; and a center of the opening of the recess on the inner edge being located at a different position in a tire circumferential direction from an extension line of a centerline of the second lateral groove.

2. The pneumatic tire according to claim 1, wherein a circumferential distance (Lf), on the inner edge of the one of the outer elements of the one of the pair of first main grooves, between the center of the opening of the recess and the extension line of the centerline of the second lateral groove is in a range of from 100% to 130% of a groove width (Y2) of the second lateral groove.

3. The pneumatic tire according to claim 1, wherein each the pair of first main grooves has a zigzag amplitude (Wj) in a range of from 50% to 70% of a groove width (W1) of each of the pair of first main grooves.

4. The pneumatic tire according to claim 1, wherein the opening of the recess, on the inner edge of the one of the outer elements of the one of the pair of first main grooves, has a width (Wd) in a range of from 80% to 110% of a groove width (Y2) of the second lateral groove.

5. The pneumatic tire according to claim 4, wherein the opening of the recess has an axial length (Le) from the inner edge of the one of the outer elements of the one of the pair of first main grooves in a range of from 45% to 135% of a groove width (W1) of the one of the pair of first main grooves.

6. The pneumatic tire according to claim 1, wherein the second lateral groove has a groove width (Y2) in a range of from 75% to 105% of a groove width (W1) of the one of the pair of first main grooves.

7. The pneumatic tire according to claim 1, wherein the second lateral groove is inclined at angle θ of from 20 to 40 degrees with respect to the tire axial direction.

8. The pneumatic tire according to claim 1, wherein a distance (Lj) from the tire equator to a zigzag center line of each of the first main grooves is in a range of from 10% to 20% of an axial distance (TW) from the tire equator to one of tread edges.

9. The pneumatic tire according to claim 1, wherein the pair of first main grooves have groove widths (W1) in a range of from 2% to 6% of an axial distance (TW) from the tire equator to one of tread edges.

10. The pneumatic tire according to claim 1, wherein circumferential lengths Li3 of inner edges in the tire axial direction of the inner elements are smaller than circumferential lengths Lo3 of outer edges in the tire axial direction of the outer elements.

11. The pneumatic tire according to claim 1, wherein
each of the second main grooves is a zigzag groove extending in a trapezoidal wave manner that comprises
second inner elements extending in parallel with the tire circumferential direction,
second outer elements extending in the tire circumferential direction at locations outside the second inner elements in the tire axial direction and being inclined with respect to the tire circumferential direction at an angle equal to or less than 10 degrees, and
second connecting elements extending with an inclination with respect to the tire circumferential direction from the second inner elements to the second outer elements.

12. The pneumatic tire according to claim 1, wherein
the plurality of first lateral grooves comprises
first lateral grooves inclined in a first direction with respect to the tire axial direction over its entire length, and
first lateral grooves inclined in a second direction opposite to the first direction with respect to the tire axial direction over its entire length.

13. The pneumatic tire according to claim 12, wherein the plurality of first lateral grooves extends in a straight manner over its entire length.

14. The pneumatic tire according to claim 13, wherein the first lateral grooves inclined in the first direction and the first lateral grooves inclined in the second direction are arrange alternately in the tire circumferential direction.

* * * * *